(12) United States Patent
Beneke

(10) Patent No.: US 10,099,738 B2
(45) Date of Patent: Oct. 16, 2018

(54) RACK FOR A BICYCLE HAVING A SEAT

(71) Applicant: Jurgen K. Beneke, Kingston, NY (US)

(72) Inventor: Jurgen K. Beneke, Kingston, NY (US)

( * ) Notice: Subject to any disclaimer, the term of this patent is extended or adjusted under 35 U.S.C. 154(b) by 360 days.

(21) Appl. No.: 14/553,375

(22) Filed: Nov. 25, 2014

(65) Prior Publication Data

US 2016/0144913 A1    May 26, 2016

(51) Int. Cl.
   *B62H 3/12*    (2006.01)

(52) U.S. Cl.
   CPC ..................... *B62H 3/12* (2013.01)

(58) Field of Classification Search
   CPC ... B62H 3/00; B62H 3/02; B62H 3/12; B62H 7/00; A47B 96/02
   USPC ............... 248/674, 692, 447.1, 48.2, 346.5; 211/14, 17, 18, 35, 19, 5, 68; 312/242
   See application file for complete search history.

(56) References Cited

U.S. PATENT DOCUMENTS

| 643,016 | A | | 2/1900 | Thum | |
|---|---|---|---|---|---|
| 2,171,181 | A | * | 8/1939 | Jordan | B22D 7/00 164/141 |
| 4,352,432 | A | * | 10/1982 | Smith | B62H 3/08 211/19 |
| 4,416,379 | A | * | 11/1983 | Graben | B62H 3/12 211/19 |
| 4,432,303 | A | * | 2/1984 | Ellerstorfer | A01K 31/06 119/460 |
| 5,078,277 | A | * | 1/1992 | Tschritter | B62H 3/08 211/20 |
| 5,125,517 | A | * | 6/1992 | Martinell | B62H 3/12 211/17 |
| D349,038 | S | * | 7/1994 | Sachs | D8/356 |
| 5,553,718 | A | | 9/1996 | Robar | |
| 5,653,890 | A | * | 8/1997 | Arato | B62H 3/12 211/18 |
| 5,687,857 | A | * | 11/1997 | Friedman | A63C 11/028 211/18 |
| 5,702,006 | A | * | 12/1997 | Durham | B25H 1/0014 211/18 |
| 7,815,055 | B2 | | 10/2010 | Lang | |
| D669,288 | S | * | 10/2012 | Brigham | D6/552 |
| 8,500,074 | B1 | | 8/2013 | Cochran et al. | |
| 8,528,749 | B2 | | 9/2013 | Kerman | |
| 8,536,993 | B2 | | 9/2013 | Ayotte et al. | |
| D707,617 | S | | 6/2014 | Flaherty et al. | |
| 8,739,979 | B2 | * | 6/2014 | Friemann | B62H 3/04 211/19 |
| 8,783,536 | B1 | | 7/2014 | Julian | |
| 8,794,454 | B2 | * | 8/2014 | Bleazard | B62H 3/12 211/19 |
| D715,698 | S | | 10/2014 | Weeks | |
| D730,247 | S | * | 5/2015 | Weeks | D12/115 |

(Continued)

FOREIGN PATENT DOCUMENTS

AU    2011101343 A4    11/2011
CN    201020168810    4/2010

*Primary Examiner* — Muhammad Ijaz
(74) *Attorney, Agent, or Firm* — Lawrence D. Cutter, Esq.

(57) ABSTRACT

A shelf for a bicycle has an upwardly pointing extension for holding a bicycle by its seat and also having an aperture for holding a helmet for use by a rider of the bicycle. In one embodiment the shelf comprises an integrally molded piece. In another embodiment the shelf also includes a frontal lip to prevent accidental falls of the bicycle from the shelf.

10 Claims, 16 Drawing Sheets

(56) References Cited

U.S. PATENT DOCUMENTS

| | | | |
|---|---|---|---|
| 2007/0215565 A1 | 9/2007 | Huang | |
| 2007/0221595 A1* | 9/2007 | Chen | A47B 95/008 211/103 |
| 2010/0170863 A1* | 7/2010 | Poisson | A63D 15/10 211/68 |
| 2013/0082016 A1 | 4/2013 | Arrow | |
| 2013/0092645 A1* | 4/2013 | Kedar | B62H 3/08 211/85.1 |
| 2013/0228535 A1* | 9/2013 | Wood | B62H 3/04 211/5 |
| 2015/0034573 A1* | 2/2015 | Peruzzo | A47F 5/08 211/18 |
| 2015/0314820 A1* | 11/2015 | Fournier | E05B 65/00 70/62 |

\* cited by examiner

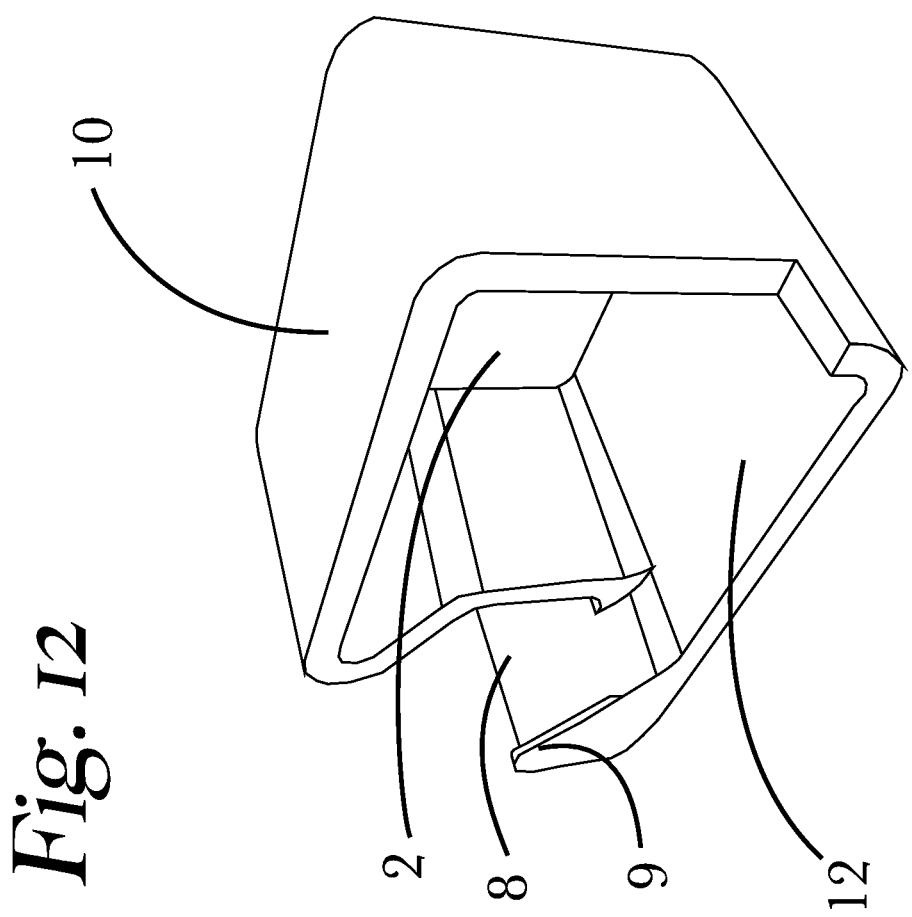

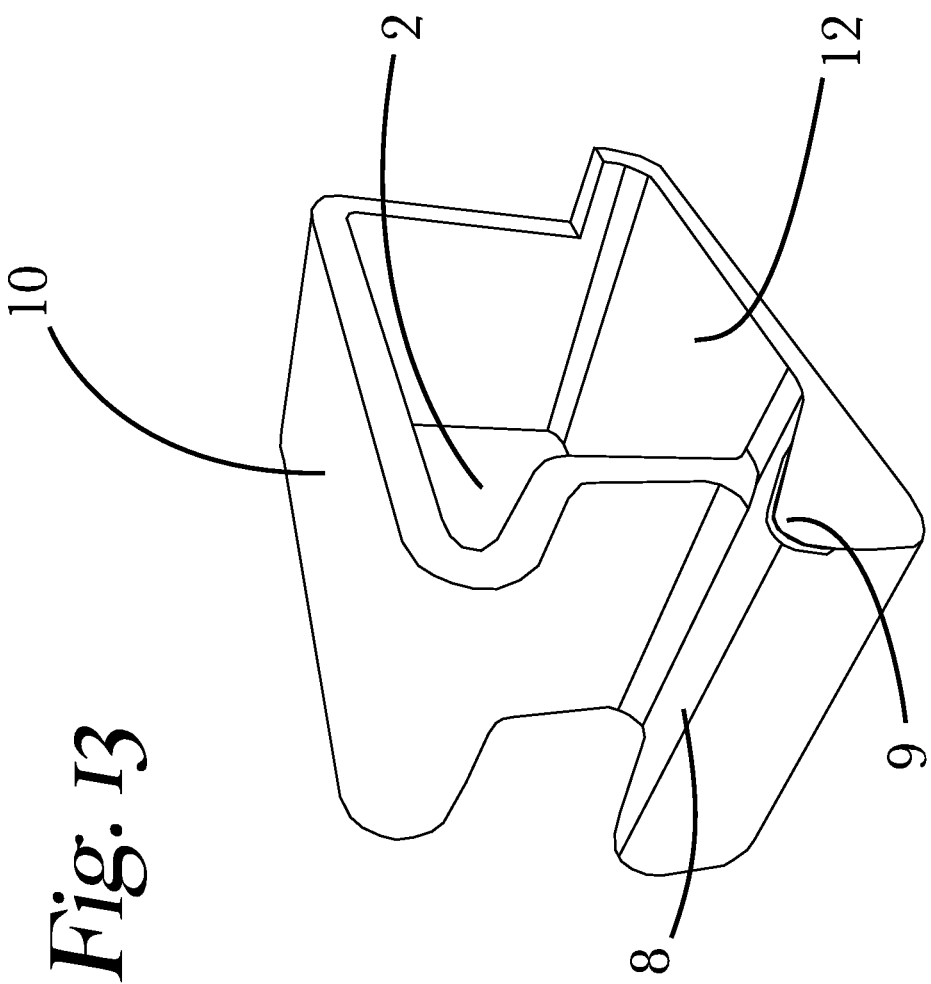

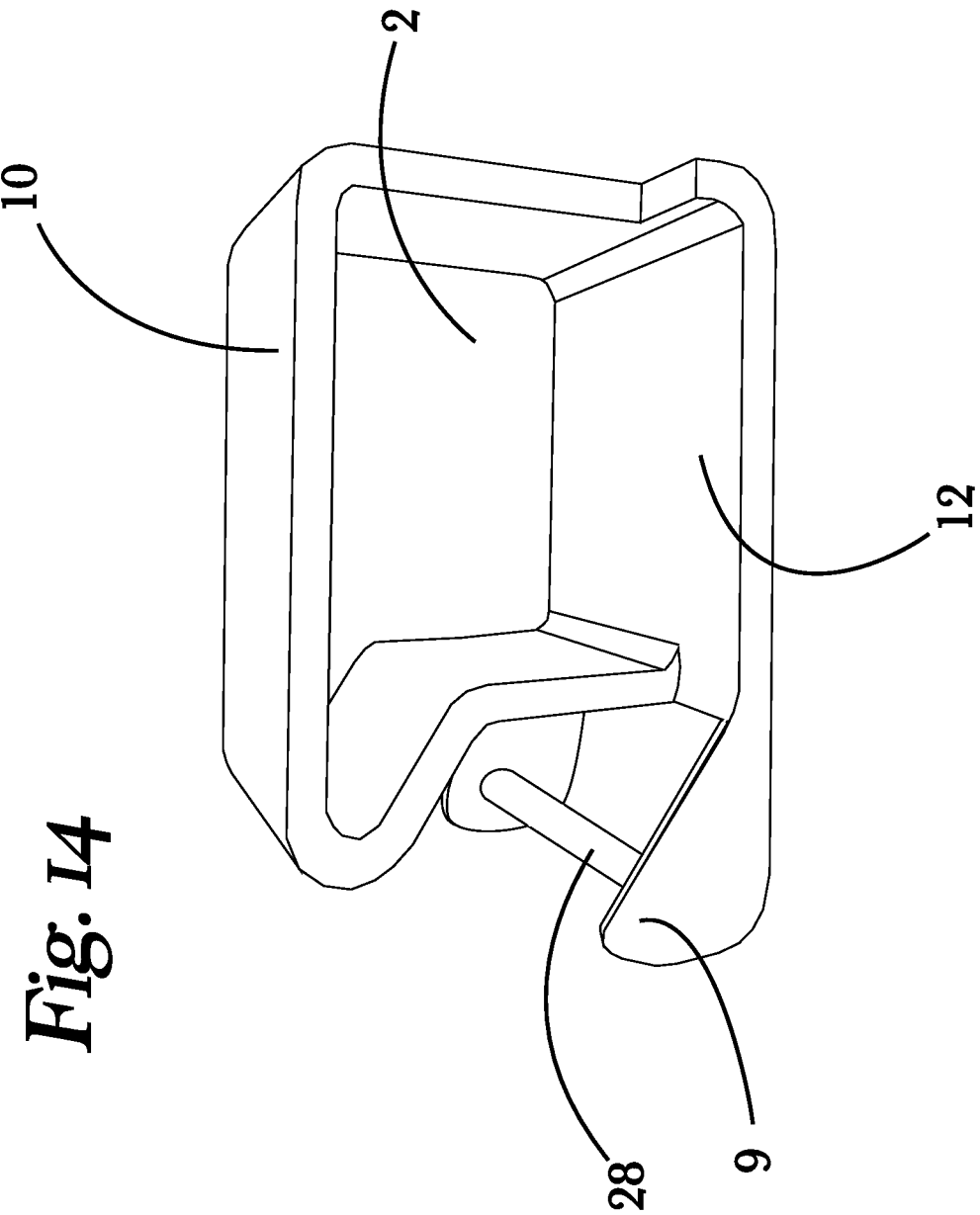

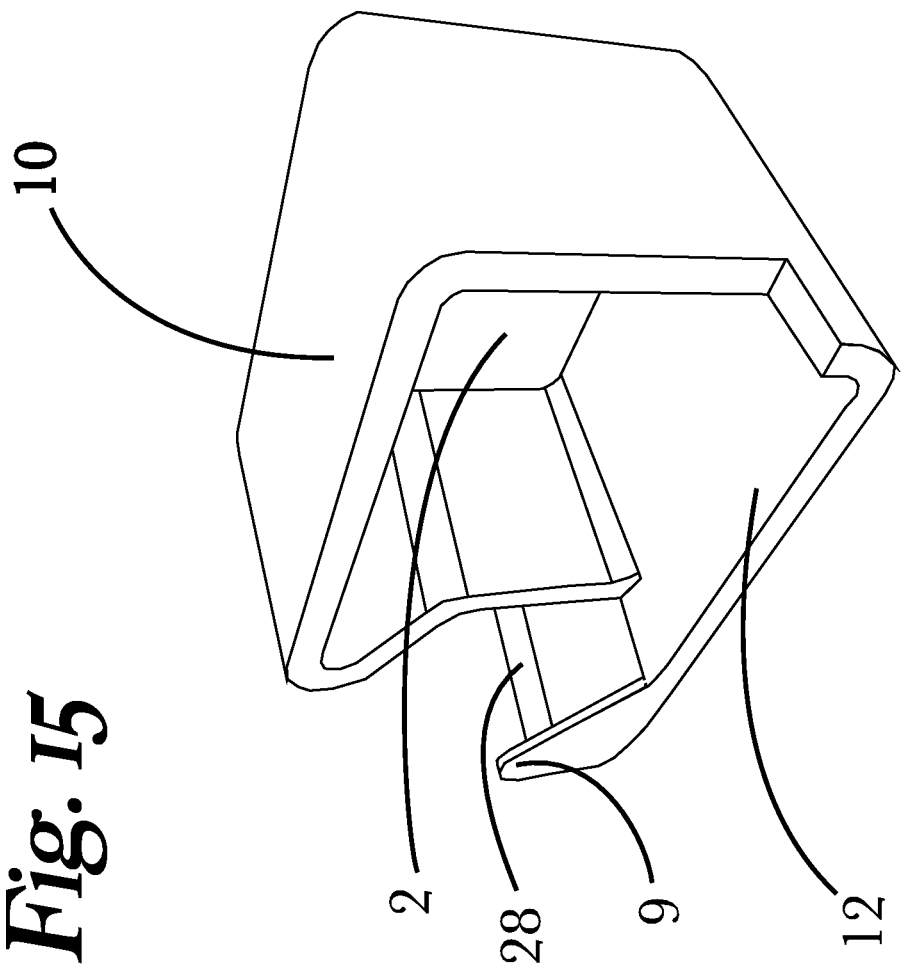

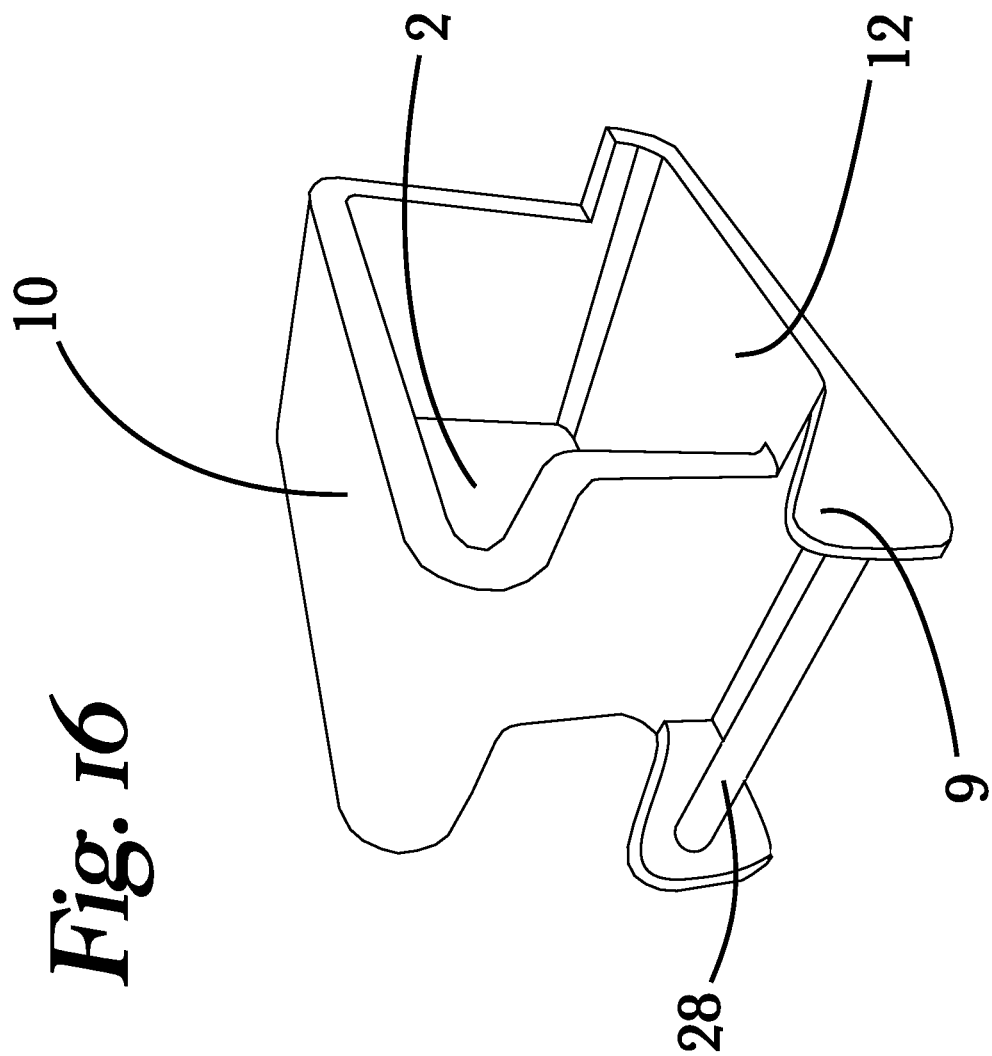

RACK FOR A BICYCLE HAVING A SEAT

CROSS-REFERENCE TO RELATED APPLICATIONS

This application contains subject matter which is related to the subject matter of the following application which is owned by the same person as this application. The present application claims priority back to the date of the filing of the application listed below which is hereby incorporated herein by reference in its entirety:

Provisional patent application having Ser. No. 61/912,313 filed on Dec. 5, 2013.

TECHNICAL FIELD

The present invention is generally directed to bicycling. More particularly, the present invention is directed to a shelf device designed for assisting in the wall mountable storage of a bicycle. Even more particularly, the present invention is directed to a device as previously described which further includes an opening into which a bicycle rider may place a riding helmet.

BACKGROUND OF THE INVENTION

Whether regarded as sport, exercise or transportation, the utilization of bicycles and the popularity of their use has grown significantly. There are many reasons for this growth including advances in bicycle technology, the recognition of the desirability of exercise, the characterization of cycling as an energy efficient means of transportation and the geographics of an urban environment in which cycling distances are sufficiently short, thus providing advantages over other forms of urban transportation. Although it is not unique to the urban environment, urban areas do provide challenges to those deciding to engage in cycling. Additionally, apartments and other dwellings in urban environments tend to have limited storage capacity. Such limitations are consonant with higher population densities found within cities and similar metropolitan areas. Furthermore, the physical dimensions of cycling vehicles render it extremely difficult, if not impossible, to sometimes provide adequate storage for bicycles especially since they are poorly sized for storage in a closet.

The present invention is also usable in commercial environments such as bicycle shops and other retail and wholesale environs where bicycles are either sold or displayed, such as at a trade show. In such environs, the present invention has the advantage of displaying many bicycles in a small area (lower retail footprint). It also provides easy access for dismounting bicycles for ease of demonstration and closer viewing.

Conventional storage of bicycles on walls is done by hooking them by the top tube of the bicycle frame or by their wheels to a shelf, hook or bracket. Hanging of a bicycle for storage by its upper tube frame is not, however, a very practical solution for bicycles designed for female riders. Additionally, it is noted that bicycle storage which employs mechanisms in which they are hung upside down by their wheels requires a clumsy lifting and inverting effort before it can be hung.

It is also to be particularly noted that many state, county and other municipal jurisdictions, in an effort to promote safety for those engaged in cycling, have passed laws, regulations and ordinances requiring cyclists to wear protective head gear. Even in locales where the wearing of helmets is not mandatory, cyclists still often opt for the use of a helmet for their own safety and protection. Accordingly, those engaged in cycling typically return to their abodes with a need to store both their bicycles and their helmets. The present invention provides a structure providing both of these functions in a single device.

From the above, it is therefore seen that there exists a need in the art to overcome the deficiencies and limitations described herein and above.

SUMMARY OF THE INVENTION

The shortcomings of the prior art are overcome and additional advantages are provided by a device for holding a bicycle which has a seat. The device of the present invention comprises a block of material having an opening on one face thereof which is sized for helmet storage. The block also includes an upwardly extending portion which holds the bicycle by its seat. In one embodiment of the invention there is further provided a safety ridge on the front portion to more readily keep a mounted bicycle from falling.

The block of the present invention may comprise any convenient material including wood, plastic and metal. However, plastic materials constitute a preferred composition in that they are lightweight, readily molded and durable. Additionally, it is noted that the present invention may be provided in both left and right-handed versions.

Accordingly, it is an object of the present invention to provide a rack for the easy storage of a bicycle.

It is another object of the present invention to promote the use of bicycles, particularly in urban locations.

It is yet another object of the present invention to provide a bicycle rack which is easily manufactured.

It is a still further object of the present invention to provide a bicycle rack that constitutes an integral structure.

It is still another object of the present invention to provide a plurality of racks for holding bicycles in an area characterized as having a small footprint.

It is another object of the present invention to provide a device for storing bicycles used by both male and female riders.

Lastly, but not limited hereto, it is an even further object of the present invention to provide a bicycle rack which is easily mountable on a wall.

Additional features and advantages are realized through the techniques of the present invention. Other embodiments and aspects of the invention are described in detail herein and are considered a part of the claimed invention. It is also noted that the terms "rack" and "shelf," as used herein to describe the present invention, are used interchangeably.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 12 is an isometric view illustrating the embodiment shown in FIG. 11 from a slightly different perspective;

FIG. 13 is an isometric view similar to that shown in 12 but from the opposite perspective;

FIG. 14 is a front isometric view of the present invention in which a cylindrical or rod shaped structure is used to support a bicycle; and FIG. 15 is an isometric view of the apparatus shown in FIG. 14 except from a different perspective.

FIG. 16 is an isometric view of the apparatus shown in FIG. 14 except from yet another perspective.

DETAILED DESCRIPTION

Figure 1:
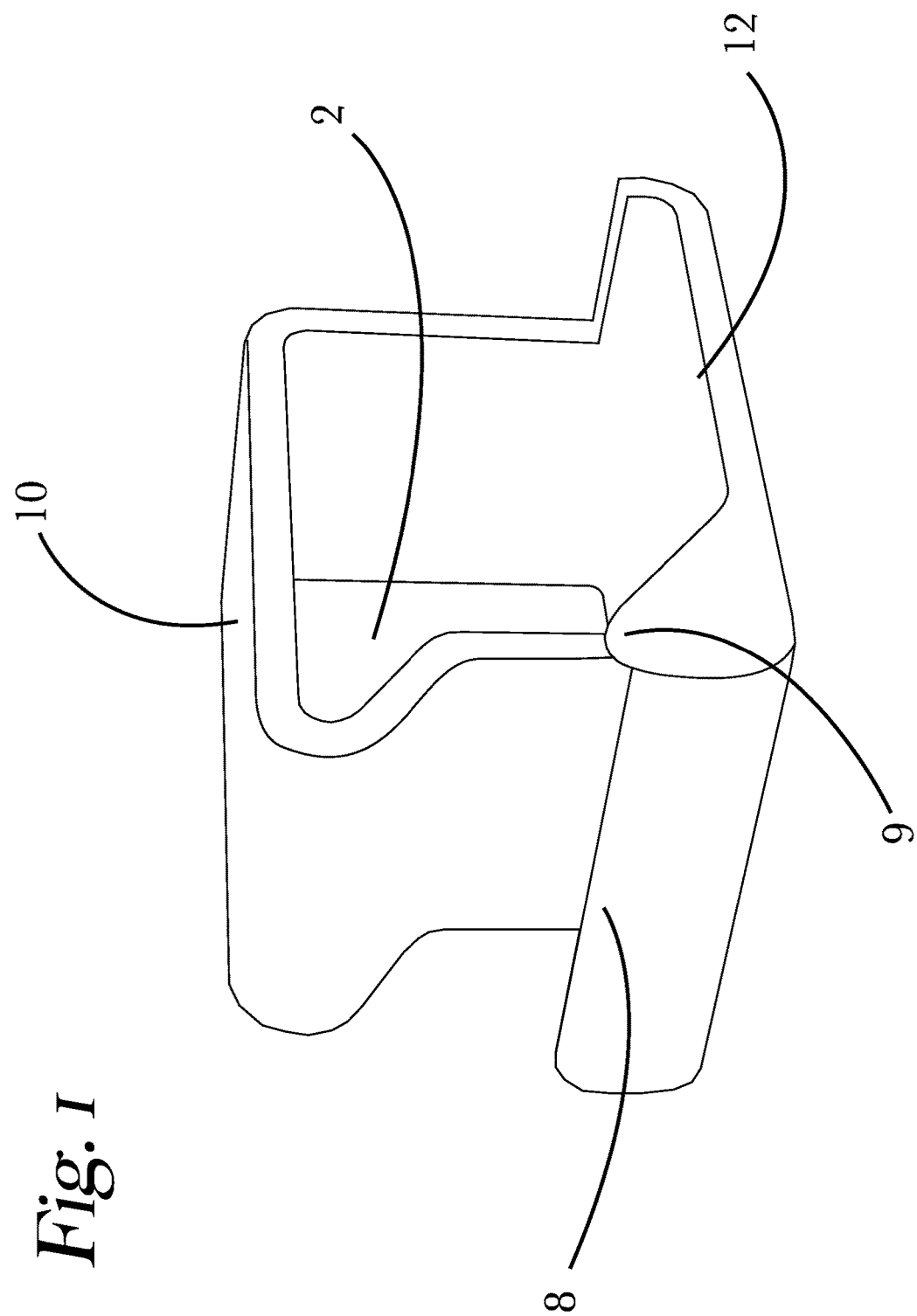
FIG. 1 is an isometric view showing the front of a completed installation (without a bicycle) in accordance with one embodiment of the present invention.

FIG. 1 is illustrative of one embodiment of the present invention. The rack of the present invention preferably comprises an integral structure formed from a single piece of material, as for example, from a mold. The rack includes an upwardly extending portion 8 which is shaped to hold a bicycle by its seat. It is noted that bicycle seats are, for all practical purposes, a universal feature of all bicycles a fact which makes the present invention universally usable to the same extent.

Another significant feature of the present invention is the presence of an aperture which is formed within the main portion of the integral structure. In the embodiment shown in FIG. 1, this aperture is bounded at least by bottom portion 12 and upper portion 10 of the integral structure. It is noted that upper portion 10 does not constitute an essential feature of the present invention, although in is preferred and assists in providing rigidity. The aperture seen in FIG. 1 and in other illustrations of the present invention is preferably sized to accommodate the insertion of a bicycle helmet. Thus, the present invention provides a rider with easy access both to his/her bicycle but to a highly desirable, if not mandated, article of safety equipment. While the aperture is preferably sized to fit a bicycle helmet, it is noted that the aperture may be sized to accommodate any cycling or other accessory such as, but not limited to, hats, scarves, goggles and gloves.

In order to provide a degree of protection against a situation in which a mounted bicycle could fall off the shelf, there is provided raised safety ridge 9 which extends upwardly from the from face of the device near seat hook 8.

Also shown in FIG. 1 is back wall 2 of the rack. It is also noted that back wall 2 is not an essential feature of the present invention. It is preferably provided to insure a desired degree of rigidity and strength. Wall 2 is also very useful for purposes of mounting the shelf on a wall, as is more particularly described below in FIGS. 9 and 10. Its presence is also consistent with molding processes that are employed in shelf manufacture. Such processes are also advantageous in that color options are more readily available, such as by changing material input to the mold without the necessity of changing the mold.

Figure 2:
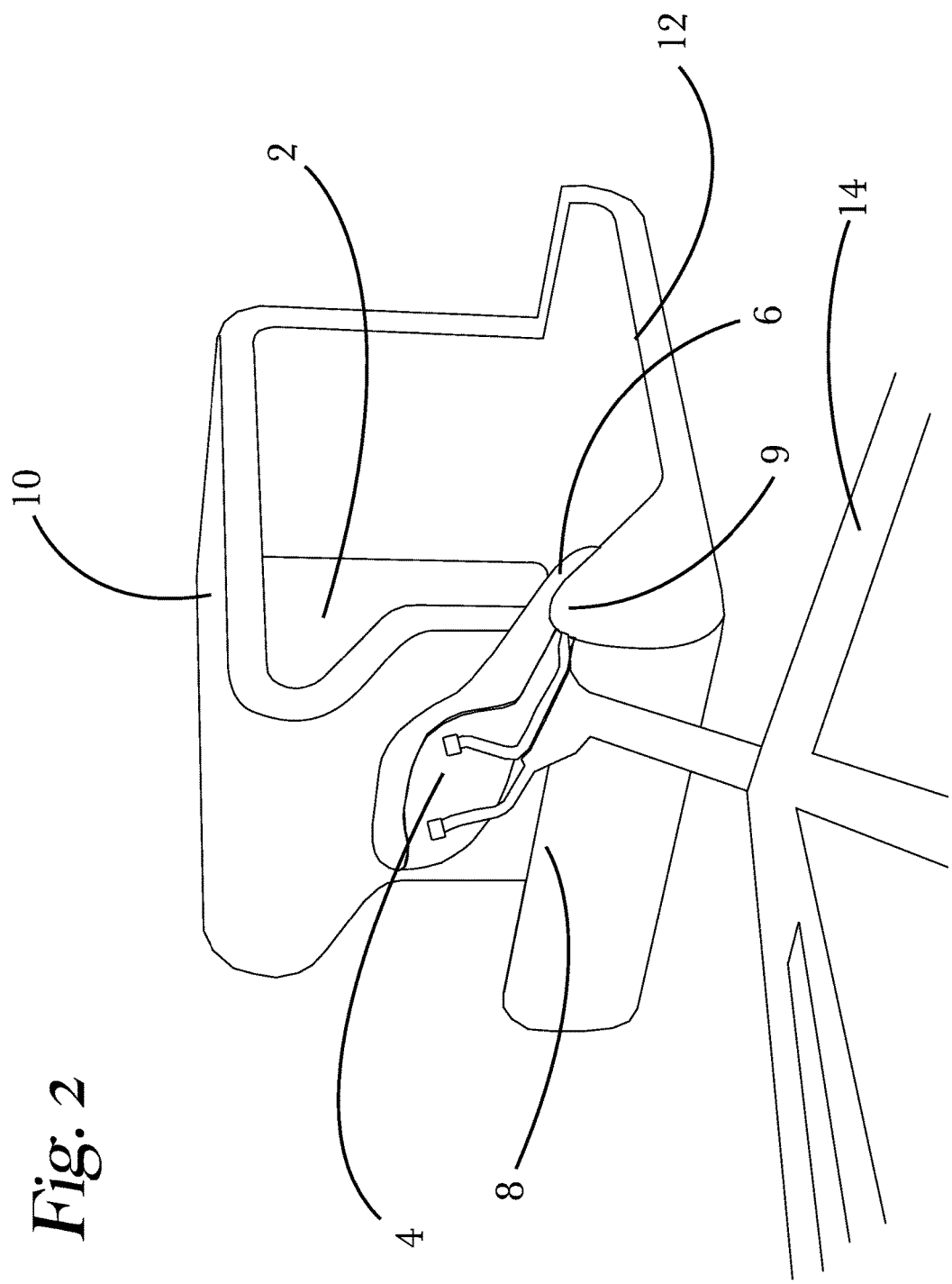
FIG. 2 is a view similar to FIG. 1 but more particularly showing, in close-up view, the manner in which a bicycle is hung on a rack structured in accordance with the present invention.
Figure 6:
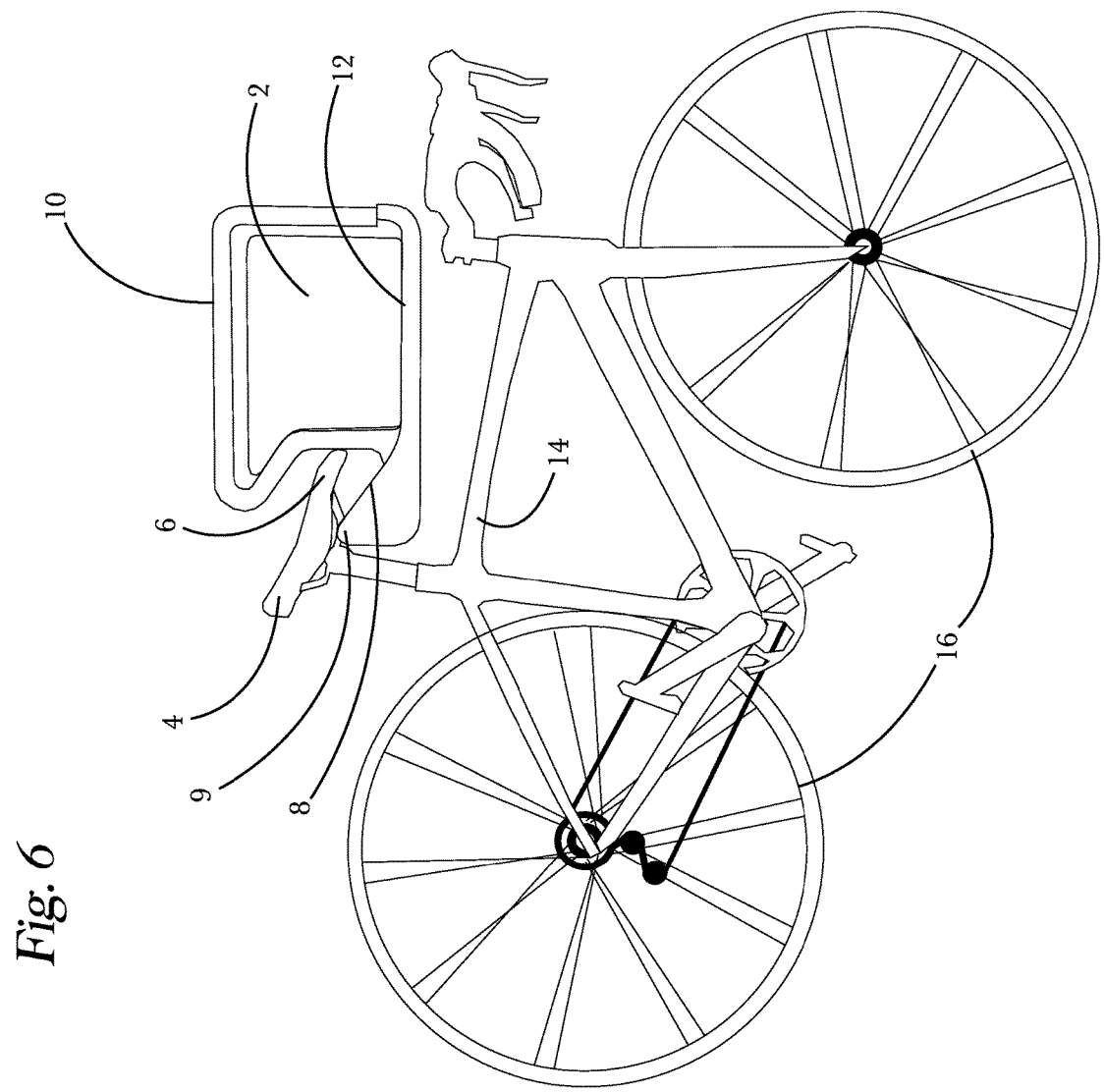
FIG. 6 is a side elevation view illustrating the use of the present invention with a bicycle in place in accordance with the usual usage of the invention.
Figure 7:
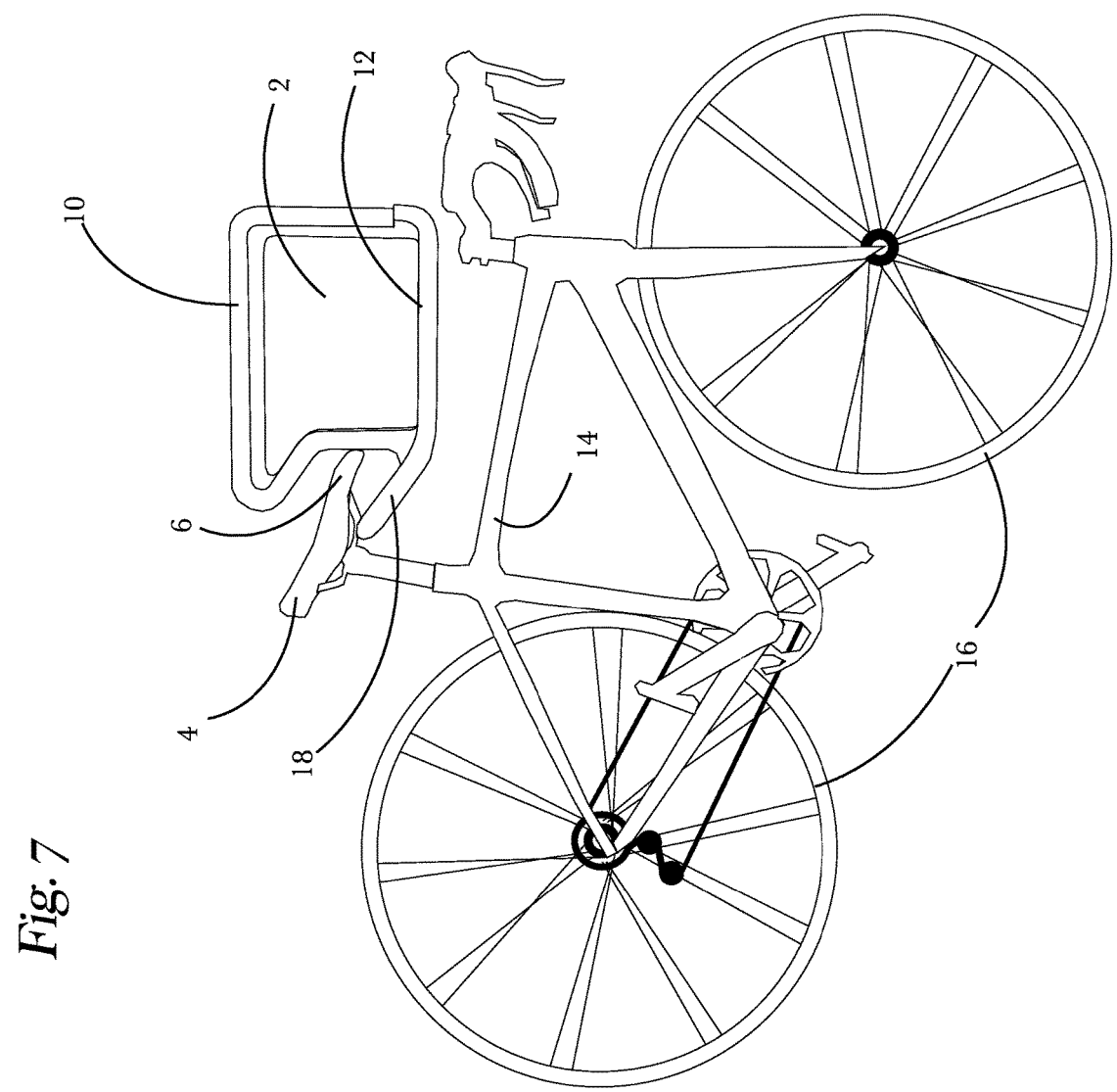
FIG. 7 is a side elevation view similar to that shown in FIG. 6 except more particularly illustrating a configuration in which a side lift lip is not present, such lips providing added protection against a bicycle slipping off the shelf.
Figure 8:
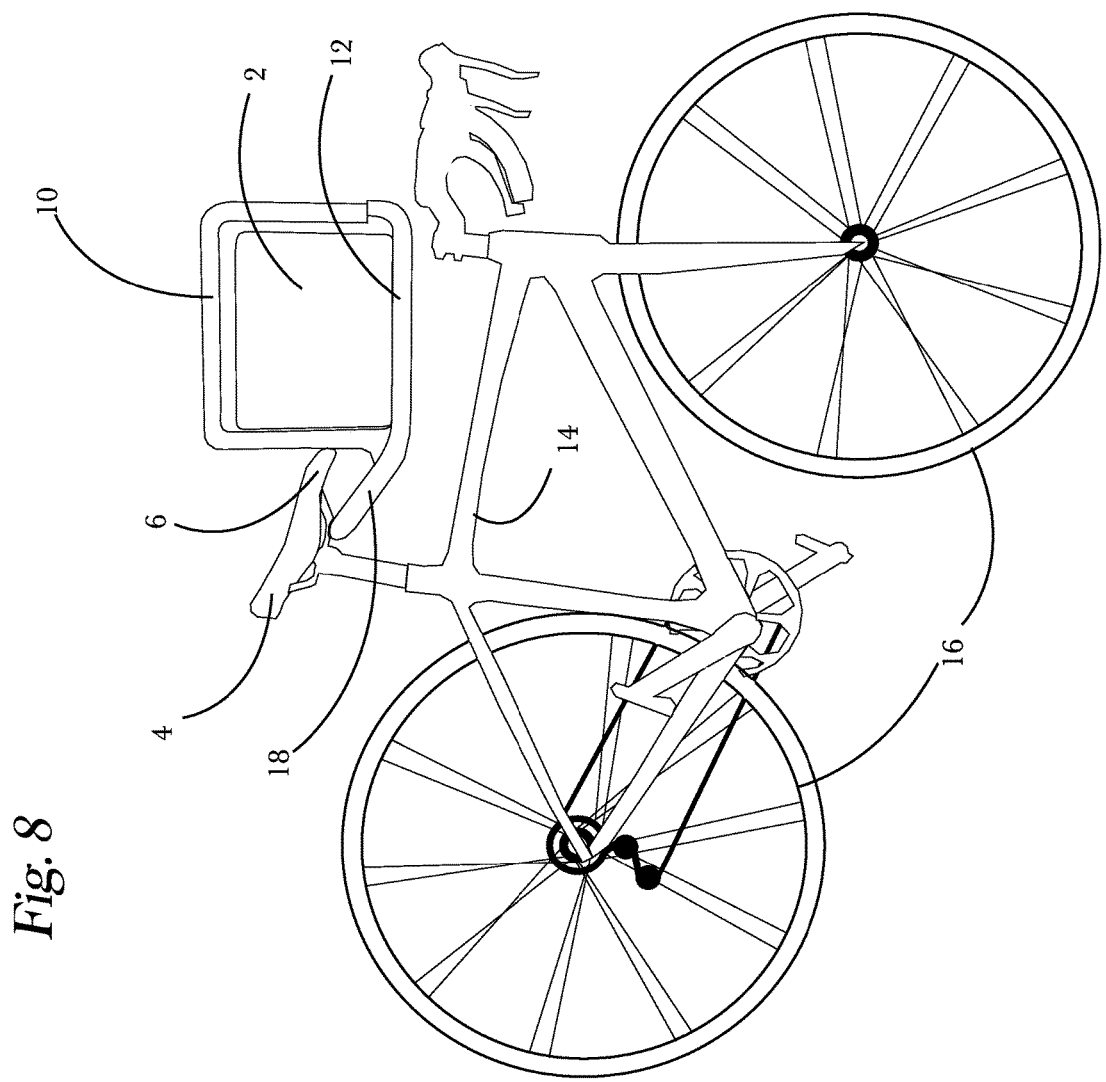
FIG. 8 is a side elevation view similar to that shown in FIG. 7 except illustrating a slightly different block structure.

FIG. 2 illustrates the present invention in its ordinary use with a bicycle suspended from it. In particular, there is shown bicycle seat 4 hooked over upwardly extending seat hook 8. In conventional bicycle storage systems, the bicycle is suspended from top tube 14 of its frame, at least for bicycles intended for male riders. Bicycles used by female riders are typically stored from ceiling mounted hooks which are used to suspend a bicycle by one or more of its wheels. FIG. 6 also illustrates the ordinary and customary use of the present invention with a bicycle hung from it. As above, bicycle seat 4 is seen hooked over seat hook 8. Top bicycle tube 14 and wheels 16 of the bicycle are also visible in this figure. FIG. 7 is similar to FIG. 6 except that it illustrates an alternate shape that is employed to embody hook 8. Likewise, FIG. 8 illustrates an alternate embodiment for the shape of the rack. Furthermore, in this regard, it is to be noted that the present invention may be embodied in a variety of shapes, some even fanciful, if desired.

Figure 3:
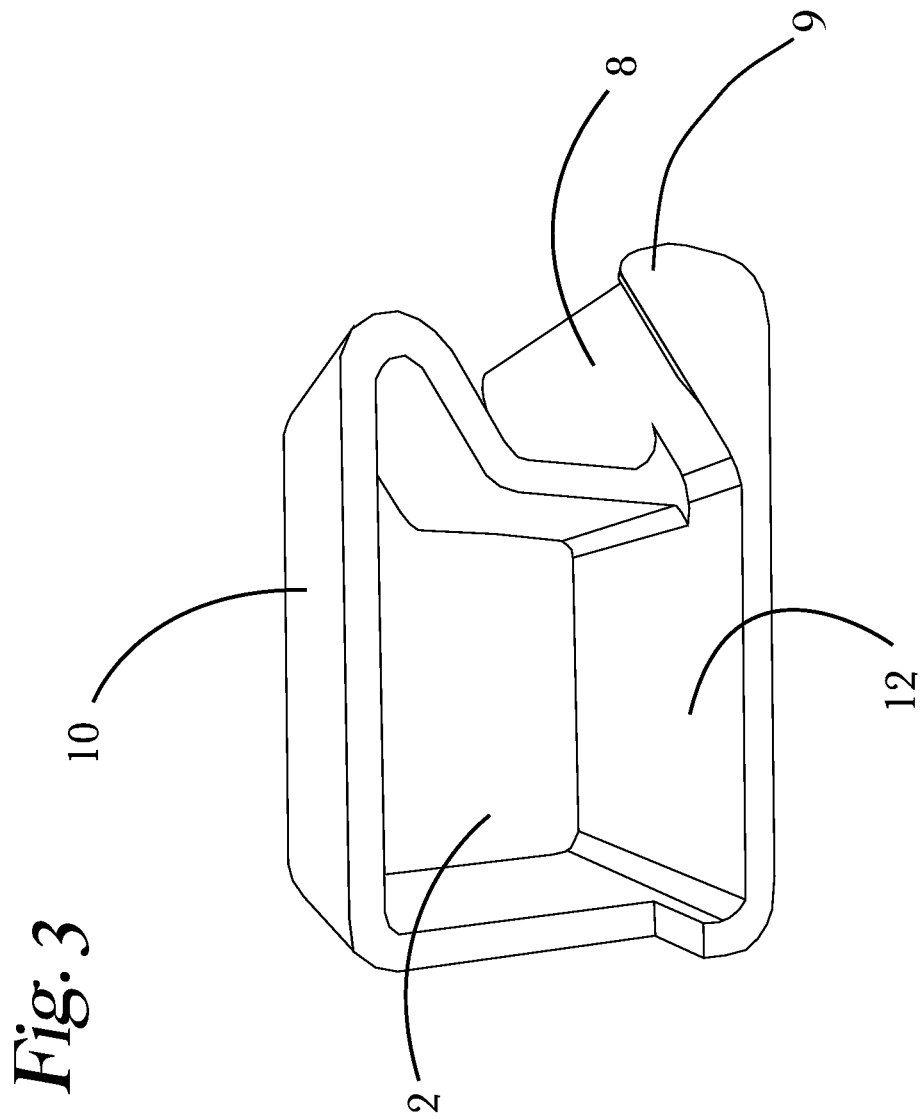
FIG. 3 is a front isometric view of the present invention in which the "horn" (an up sloping seat hook) portion of the present invention extends to the right.
Figure 4:
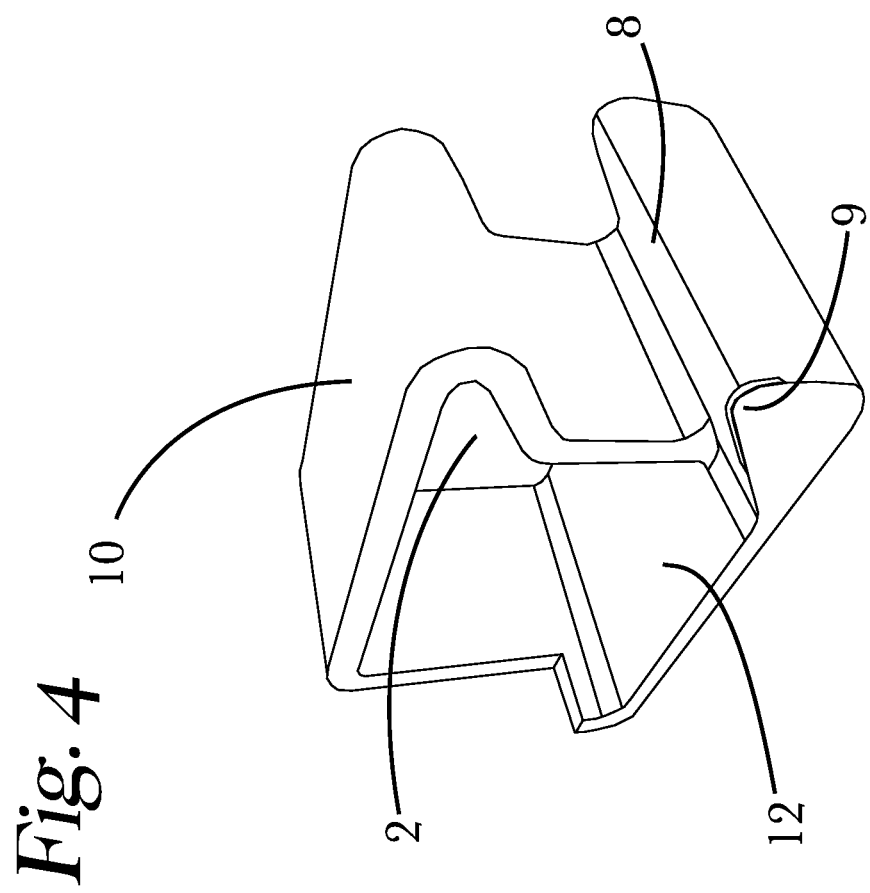
FIG. 4 is a view similar to that shown in FIG. 3 but more particularly showing an angled isometric view.
Figure 5:
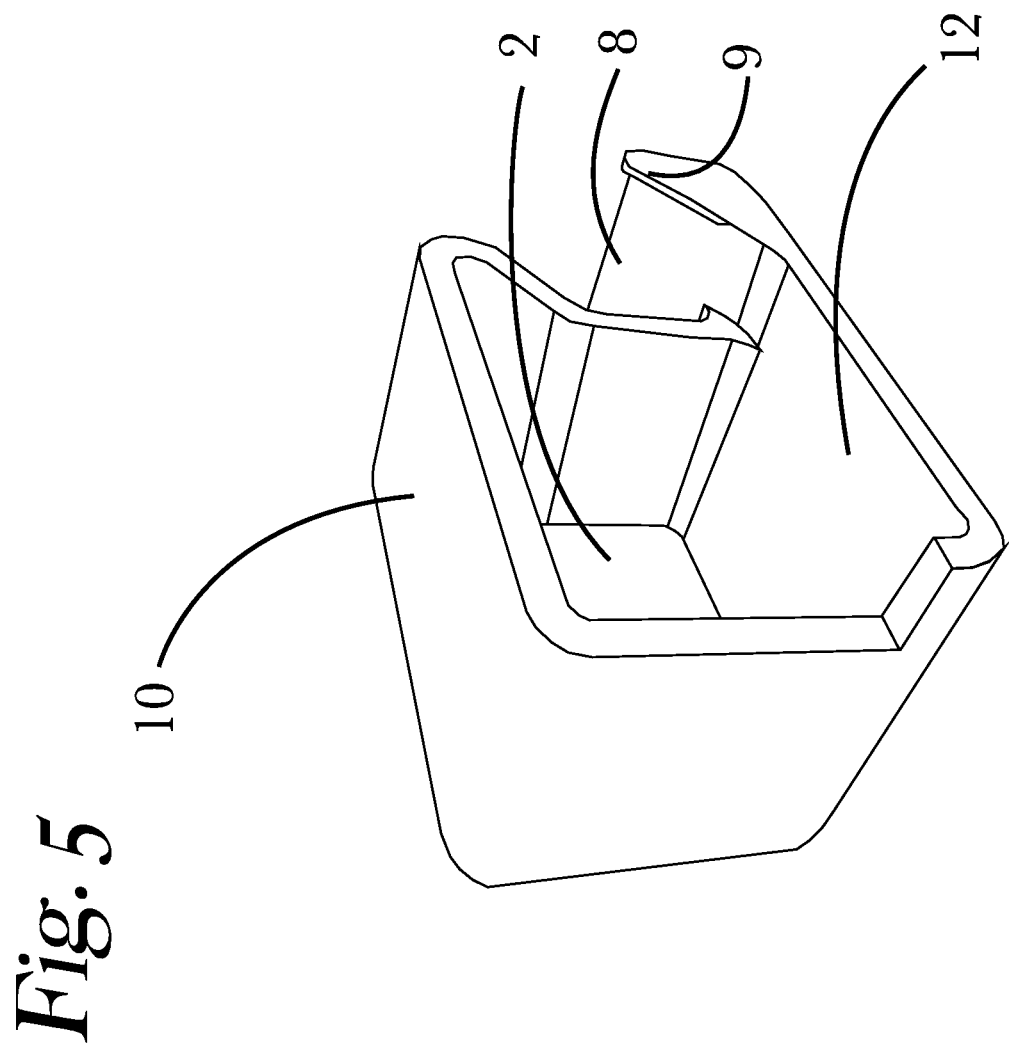
FIG. 5 is a view similar to that shown in FIG. 3 but more particularly showing a bicycle shelf with a smaller sloped upward seat hook.

FIG. 3 illustrates an embodiment of the present invention in which upwardly extending seat hook 8 is disposed on the right side of the unit. FIG. 4 is a view similar to that shown in FIG. 3 except from a perspective which better illustrates the presence of raised safety edge 9. Again, FIG. 5 provides yet another view of the rack of the present invention from a somewhat different view so as to enhance the clarity and understanding of its structure. Reference numerals shown in the Figures herein are used to refer to the same items as shown and as found in the list of items below.

Figure 9:
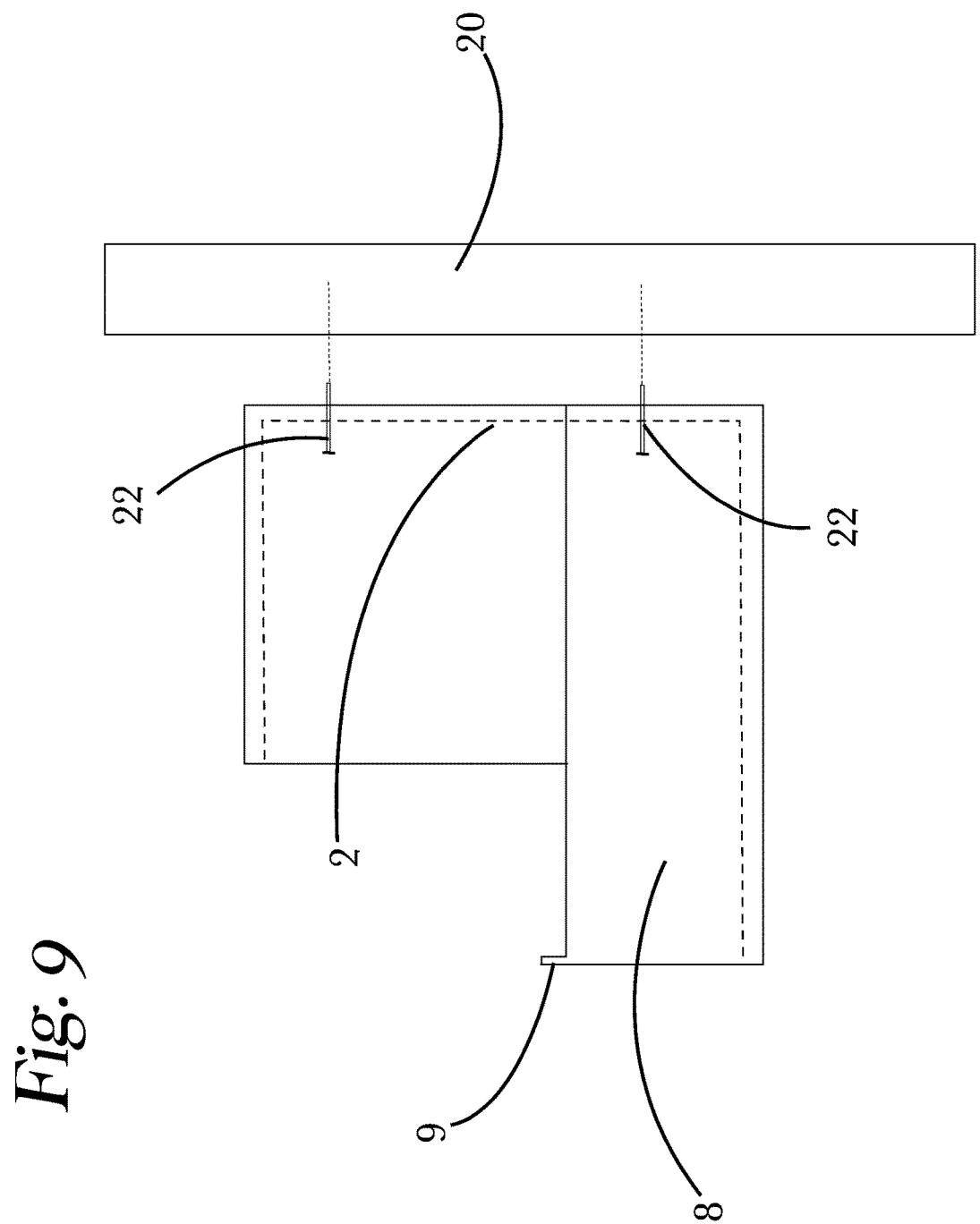
FIG. 9 is an end elevation view of one embodiment of the present invention more particularly illustrating a method for its attachment to a wall or some other vertical structure.
Figure 10:
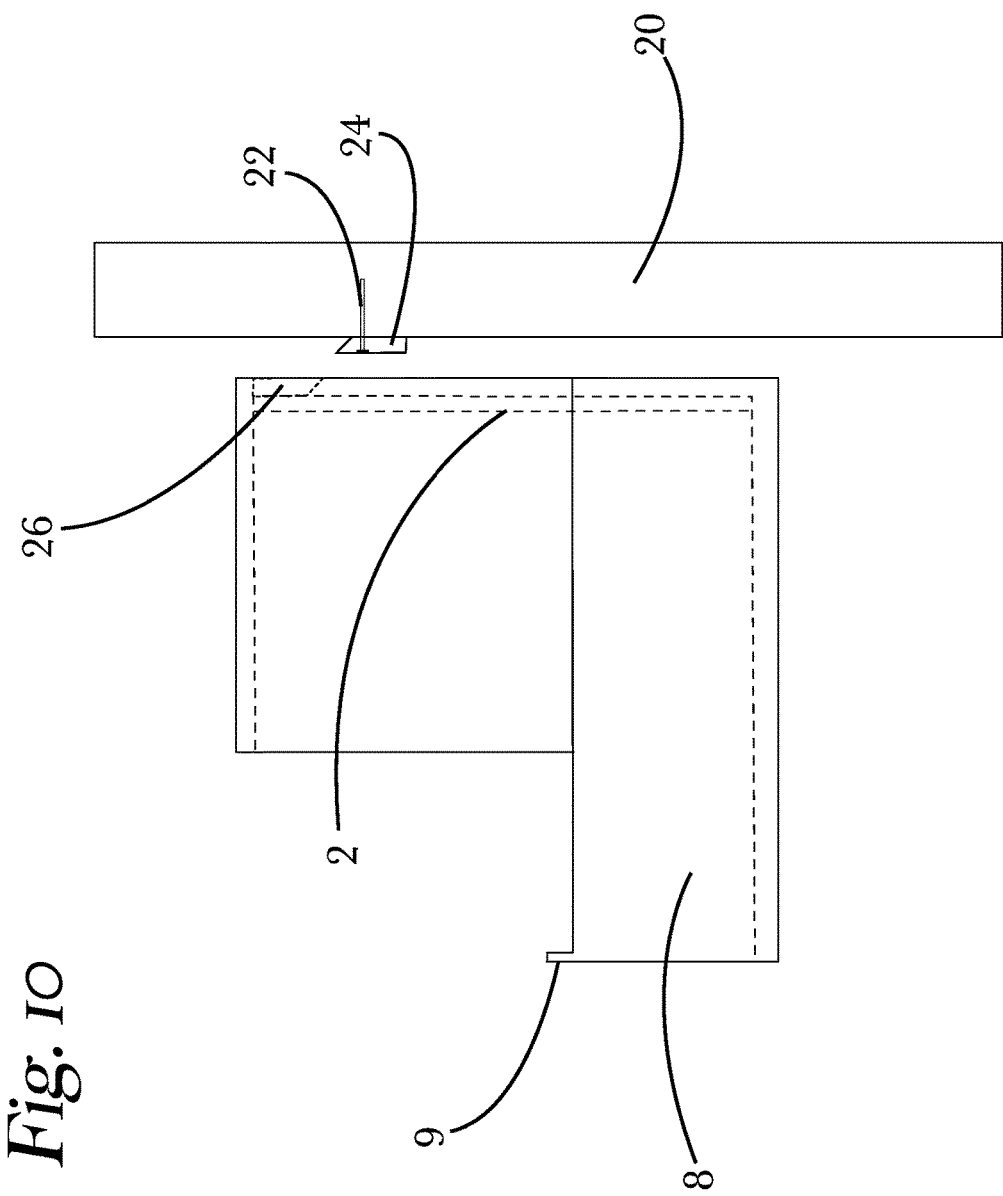
FIG. 10 is a view similar to FIG. 9 except more particularly illustrating an alternate method for attachment of the present invention to a wall or similar structure.

As indicated above, the present invention is easily mounted on a wall or other surface. For this purpose, one may employ nails, screws or molly bolts. If it is truly "super" strength in nature, adhesives are also employable, though not preferred. FIG. 9 illustrates the use of nails 22 for affixation of the rack to wall 20, typically an interior wall, though clearly not limited thereto. Nail or screw openings are providable beforehand in a finished product via a molding process, if that is the route of manufacture selected. In an alternate method of affixation, mounting cleat 24, for wall installation, is shown affixed to wall 20 via nail (only one nail visible) 22. Screws or other anchoring means may also be employed with cleat 24. Cleat 24 includes an upwardly angled portion, as shown, intended to mate with a correspondingly shaped portion 26 on back 2 of the rack. See FIG. 10.

Figure 11:
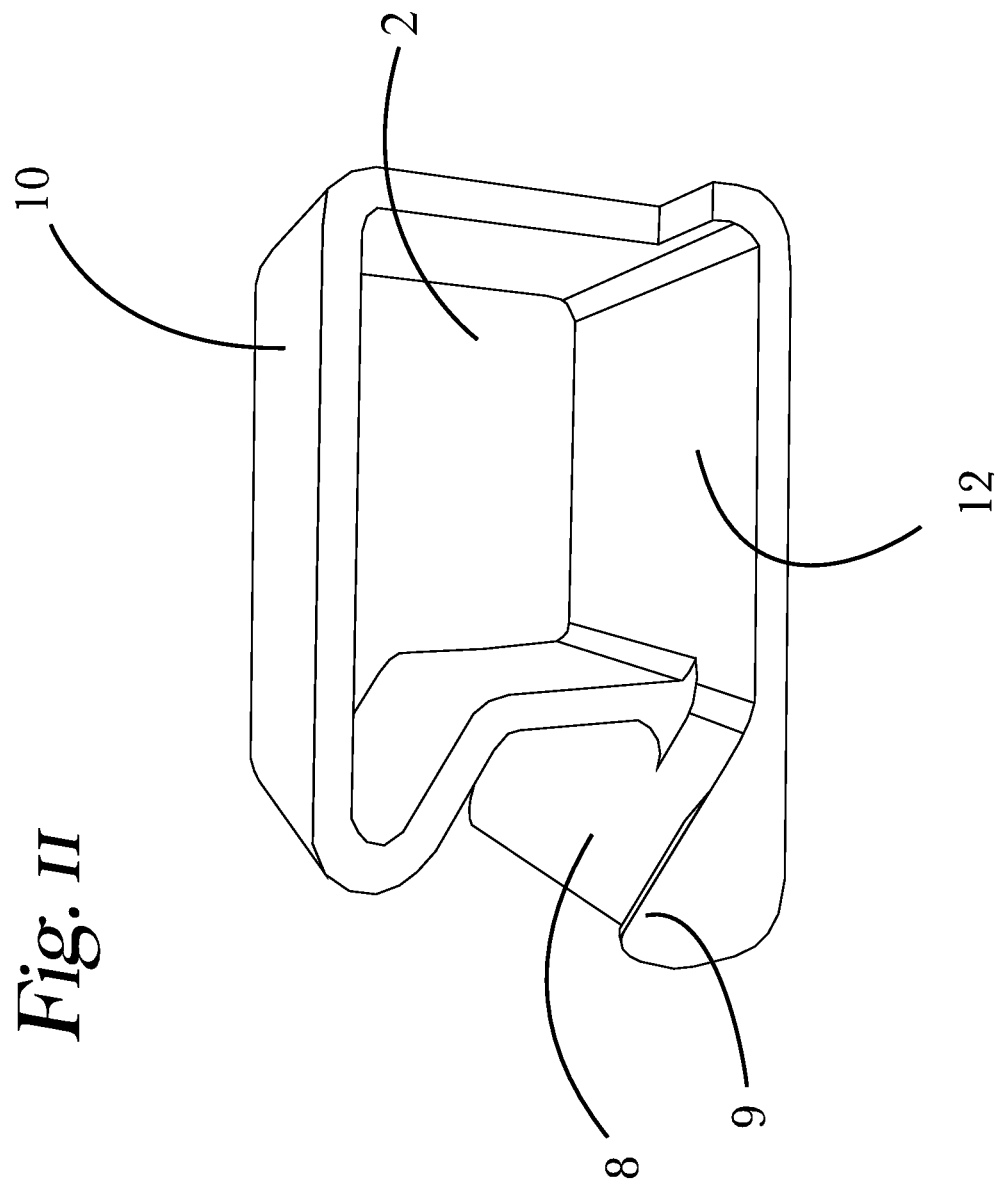
FIG. 11 is a view similar to FIG. 5 except that it more particularly illustrates an embodiment of the present invention in which the helmet aperture extends all the way through the shelf.

FIGS. 11, 12 and 13, as described above are included to provide further views of the present invention from different perspectives so as to enhance the clarity of understanding. As above, reference numerals shown therein are used to refer to the same items as shown and discussed above.

FIGS. 14, 15 and 16 depict an alternate embodiment of the present invention from three different perspective views in which support of bicycle seat 4 is provided by rod 28. Rod 28 is attachable to the shelf in several different ways. Firstly, rod 28 may comprise a spring loaded dowel that urges its ends into openings in the shelf. This is a well-known structure ubiquitously found in toilet paper dispensers. Secondly, rod 28 may comprise an integral dowel structure which is dropped down into slots (not shown in the embodiment of FIG. 14-16) in the main shelf structure. Thirdly, rod 28 may comprise a molded-in cylinder extending from one arm of upwardly extending "horn" portions to an opposite arm. Note that here, the word "cylindrical" is not limited to objects having circular cross-sections. Here, any convenient cross-section is employable including, but not limited to elliptical, rectangular, square or triangular cross-sections.

| List of Reference Numerals | |
|---|---|
| Reference Numeral | Item Identified |
| 2 | back wall of bicycle shelf |
| 4 | bicycle seat |
| 6 | tip of bicycle seat |
| 8 | sloped upward seat hook |
| 9 | raised safety edge |
| 10 | top shelf of the bicycle shelf |
| 12 | bottom and main shelf of bicycle shelf |
| 14 | top tube of bicycle frame |
| 16 | bicycle wheel |
| 18 | small sloped upward seat hook |
| 20 | wall |
| 22 | wall anchor, screw or nail |
| 24 | mounting cleat for wall installation |
| 26 | mounting cleat on bicycle shelf |
| 28 | rod |

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC § 112, sixth paragraph, unless the element is expressly recited using the phrase "means for."

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A device for holding a bicycle having a seat and for holding cycling gear, said device comprising:
a block having a front face, a rear face, and two opposite sides and an aperture in said front face configured to hold said cycling gear, said block also having an upwardly extending projection extending from and beyond at least one of said sides and configured to hold of said bicycle by said seat, said upwardly extending projection extending upwardly and outwardly from said block in a direction parallel to said front face said projection terminating at a height below a top surface.

2. The device of claim 1 in which said block comprises material selected from the group consisting of metal, wood and plastic.

3. The device of claim 1 in which said aperture is sized to contain a cyclist's helmet.

4. The device of claim 1 in which said rear face is configured to mount said device.

5. The device of claim 4 in which said rear face includes openings therein for accepting mounting fasteners.

6. The device of claim 1 in which said projection extends to the left, as seen from a frontal view.

7. The device of claim 1 in which said projection extends to the right, as seen from a frontal view.

8. The device of claim 1 further including a ridge for preventing said bicycle from sliding off of said device, said ridge being disposed adjacent to said upwardly extending projection and distally from said rear face.

9. The device of claim 1 in which said device comprises a structure formed from a single piece of material.

10. A device for holding a bicycle having a seat and for holding a person's bicycle helmet, said device having a front face, a rear face and two opposite sides and an upwardly extending projection extending from and beyond at least one of the sides of said device, said projection being configured to hold said bicycle by said seat, said projection said projection terminating at a height below a top surface, and said device having an aperture in said front face configured to hold said helmet.

* * * * *